(12) United States Patent
Ahn et al.

(10) Patent No.: US 12,534,025 B2
(45) Date of Patent: Jan. 27, 2026

(54) MOVING DISPLAY DEVICE AND VEHICLE USING THE SAME

(71) Applicant: HYUNDAI MOBIS CO., LTD., Seoul (KR)

(72) Inventors: Sung Joon Ahn, Seoul (KR); Shin Jik Lee, Hwaseong-si (KR); Tae Hun Kim, Seongnam-si (KR); Hyun Jun An, Gunpo-si (KR); Kyung Hoon Kim, Yongin-si (KR); Ji Soo Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 162 days.

(21) Appl. No.: 18/464,801

(22) Filed: Sep. 11, 2023

(65) Prior Publication Data

US 2024/0140327 A1    May 2, 2024

(30) Foreign Application Priority Data

Oct. 27, 2022    (KR) ........................ 10-2022-0140463

(51) Int. Cl.
| | |
|---|---|
| *B60R 11/02* | (2006.01) |
| *B60K 35/00* | (2024.01) |
| *B60K 35/50* | (2024.01) |
| *B60R 11/00* | (2006.01) |

(52) U.S. Cl.
CPC .......... *B60R 11/0235* (2013.01); *B60K 35/00* (2013.01); *B60K 35/50* (2024.01); *B60K 2360/816* (2024.01); *B60R 2011/0084* (2013.01); *B60R 2011/0085* (2013.01)

(58) Field of Classification Search
CPC ........................... B60R 11/0235; B60K 35/50
See application file for complete search history.

(56) References Cited

U.S. PATENT DOCUMENTS

| | | | | |
|---|---|---|---|---|
| 5,941,615 | A * | 8/1999 | Ito ......................... | F16M 11/18 |
| | | | | 348/827 |
| 7,561,070 | B2 * | 7/2009 | Rhodes ............... | G01C 21/265 |
| | | | | 340/995.14 |
| 9,688,146 | B2 * | 6/2017 | Kim ...................... | B60K 35/53 |
| 10,434,847 | B2 * | 10/2019 | Yoshizumi .............. | G09G 3/20 |
| 10,500,956 | B2 * | 12/2019 | Crijns .................... | B60K 35/10 |
| 11,192,504 | B2 * | 12/2021 | Bennett .................. | B60R 3/005 |
| 11,273,747 | B1 * | 3/2022 | Kim ........................ | B60N 3/002 |
| 11,370,381 | B1 * | 6/2022 | Mihm ................... | B60R 21/205 |
| 11,560,059 | B2 * | 1/2023 | Kim ....................... | B60K 35/10 |
| 11,752,872 | B2 * | 9/2023 | Kadam .................. | B60K 37/00 |
| | | | | 296/70 |
| 12,054,103 | B2 * | 8/2024 | Jang ........................ | G09F 9/30 |
| 12,083,964 | B2 * | 9/2024 | Rook .................. | B60K 35/215 |
| 12,162,424 | B2 * | 12/2024 | An ....................... | B60R 21/263 |
| 2003/0128103 | A1 * | 7/2003 | Fitzpatrick ............ | B60K 35/53 |
| | | | | 345/1.3 |

(Continued)

*Primary Examiner* — Irfan Habib
(74) *Attorney, Agent, or Firm* — NSIP Law

(57) ABSTRACT

A moving display device disposed in a vehicle includes a display configured to be moveable in a forward or backward direction according to a driving mode of a vehicle, and a moving device mounted on a rear of the display and being configured to move a position of the display and to tilt the display, wherein the moving device includes rails, actuators, and gear modules for forward or backward movement of the display.

15 Claims, 14 Drawing Sheets

(56) References Cited

U.S. PATENT DOCUMENTS

| | | | | |
|---|---|---|---|---|
| 2008/0235716 A1* | 9/2008 | Sugiura | B60R 11/0235 | 720/601 |
| 2009/0001747 A1* | 1/2009 | Yeo | B60R 11/0235 | 296/37.8 |
| 2009/0279235 A1* | 11/2009 | Hatanaka | B60R 11/0258 | 361/679.01 |
| 2009/0279236 A1* | 11/2009 | Hatanaka | B60R 11/0235 | 361/679.01 |
| 2010/0108844 A1* | 5/2010 | Ogawa | B60R 11/0235 | 248/274.1 |
| 2010/0161176 A1* | 6/2010 | Auner | B60H 1/00985 | 701/1 |
| 2012/0187262 A1* | 7/2012 | Hirota | B60R 11/0235 | 248/201 |
| 2012/0199621 A1* | 8/2012 | Yoon | B60R 11/02 | 224/483 |
| 2012/0318836 A1* | 12/2012 | Maeda | B64D 11/00153 | 224/311 |
| 2014/0085787 A1* | 3/2014 | Kato | F16H 21/22 | 361/679.01 |
| 2016/0193923 A1* | 7/2016 | Kim | B60K 35/50 | 296/70 |
| 2017/0262057 A1* | 9/2017 | Knittl | B60K 35/53 | |
| 2018/0373034 A1* | 12/2018 | Saitou | B60R 11/0235 | |
| 2019/0351838 A1* | 11/2019 | Aono | B60R 11/0252 | |
| 2020/0039444 A1* | 2/2020 | Rook | B60R 11/0235 | |
| 2021/0206270 A1* | 7/2021 | Diboine | B60K 35/22 | |
| 2021/0212221 A1* | 7/2021 | Diboine | G09F 9/301 | |
| 2022/0089104 A1* | 3/2022 | Ono | H04N 23/53 | |
| 2022/0348159 A1* | 11/2022 | Mihm | B60K 37/20 | |
| 2022/0388457 A1* | 12/2022 | Lathwesen | B60K 35/50 | |
| 2024/0026920 A1* | 1/2024 | Mitsui | G06F 1/1681 | |
| 2025/0026281 A1* | 1/2025 | Teufel | B60K 35/60 | |
| 2025/0033586 A1* | 1/2025 | Kim | B60R 16/037 | |

* cited by examiner

MOVING DISPLAY DEVICE AND VEHICLE USING THE SAME

CROSS-REFERENCE TO RELATED APPLICATION(S)

This application claims priority under 35 U.S.C. § 119 to Korean Application No. 10-2022-0140463, filed on Oct. 27, 2022, in the Korean Intellectual Property Office, the entire disclosure of which is incorporated herein by reference for all purposes.

BACKGROUND

1. Field

The following description relates to vehicles in all fields, and more specifically, for example, may be applied to vehicles supporting autonomous driving.

2. Discussion of Related Art

With the advent of self-driving vehicles, various researches have been conducted on methods for increasing passenger convenience. As an example, a method of increasing the visibility and convenience of passengers by moving the position of a display left/right or up/down according to a driving mode has been proposed. In addition, in an autonomous driving mode, a technology for implementing a steering wheel in a retractable manner to allow passengers to move more freely has been proposed.

However, when the display is moved left/right or up/down, a distance between the passenger and the display is maintained and thus there is bound to be a limit to ensuring the visibility of the passengers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided, a moving display device including a display configured to be moveable in a forward or backward direction according to a driving mode of a vehicle, and a moving device mounted on a rear of the display and being configured to move a position of the display and to tilt the display, wherein the moving device includes rails, actuators, and gear modules for forward or backward movement of the display.

The moving device may include an actuator of the actuators configured to provide a driving force for forward or backward movement of the display.

The rails may include a first moving rail configured to be moved forward and backward by the actuator, a second moving rail disposed above the first moving rail, and a rail connection bush may connect the first moving rail and the second moving rail, wherein a first end of the first moving rail and a first end of the second moving rail may each be coupled to the display.

The first end of the first moving rail and the first end of the second moving rail may each be coupled to a display hinge, and a second end of the first moving rail and a second end of the second moving rail may be coupled by a tension spring.

The actuator may be configured to move the first and second moving rails forward simultaneously, in response to the display protruding forward, and a flange located at the second end of the second moving rail may be configured to move the second moving rail by a distance and to stop the second moving rail.

In response to the display tilting, a displacement of the first moving rail may be larger than a displacement of the second moving rail, the tension spring may be extended, and the display may be tilted backward by the display hinge.

In response to the display being restored from tilting, the tension spring may be decompressed to move the first moving rail backward, and the first and second moving rails may move backward simultaneously with the display being restored from tilting.

The first end of the first moving rail may be coupled to a display hinge and the first end of the second moving rail is coupled to a display gear, and the display gear may include a rotating gear and a torsion spring, and is configured to move the display forward and backward through engagement between a gear part formed on the first moving rail and the rotation gear.

The actuator may be configured to move the first and second moving rails forward simultaneously in response to the display protruding forward, and a flange located at the second end of the second moving rail may be configured to move the second moving rail by a distance and to stop the second moving rail.

In response to the display tilting, a displacement of the first moving rail may be larger than a displacement of the second moving rail, the torsion spring may be compressed, and the rotating gear may rotate counterclockwise to tilt the display backward.

In response to the display being restored from tilting, the torsion spring may be decompressed, the rotating gear may rotate clockwise to move the first moving rail backward, and the first and second moving rails may move backward simultaneously with the display being restored from tilting.

In another general aspect there is provided a vehicle, including a cockpit, and a moving display device mounted in the cockpit of the vehicle, wherein the moving display device comprises a display configured to be moveable in a forward or backward direction according to a driving mode of a vehicle, and a moving device mounted on a rear of the display and being configured to move a position of the display and to tilt the display, wherein the moving device includes rails, actuators, and gear modules for forward or backward movement of the display, and wherein the moving display is configured to perform at least one of forward movement, backward movement, or tilting, in response to a boarding mode of the vehicle being changed.

A driving mode of the vehicle may include an autonomous driving mode and a manual driving mode.

The moving display may move forward in a direction of a driver and may tilt in a direction of the cockpit, in response to the boarding mode of the vehicle being the autonomous driving mode.

The moving display may rotate to a state prior to tilting and the moving display may move backward in a direction of the cockpit, in response to the boarding mode being the manual driving mode.

In another general aspect there is provided a vehicle including a display mounted on an assembly that is in cockpit of the vehicle, the assembly comprising a first servo configured to slide the display frontward and rearward relative to a front and a rear of the vehicle, a second servo configured to tilt the display on an axis perpendicular to the length of the vehicle, and a computing apparatus configured to provide a signal to be displayed by the display and configured to control the first and second servos.

The assembly may include a first moving rail configured to be moved frontward and rearward by the first servo, a second moving rail disposed above the first moving rail, and a rail connection bush connecting the first moving rail and the second moving rail, wherein a first end of the first moving rail and a first end of the second moving rail are each coupled to the display.

The first end of the first moving rail may be coupled to a display hinge and the first end of the second moving rail may be coupled to a display gear, and the display gear may include a rotating gear and a torsion spring, and may be configured to move the display frontward and rearward through engagement between a gear part formed on the first moving rail and the rotation gear.

Other features and aspects will be apparent from the following detailed description, the drawings, and the claims.

Figure 1:
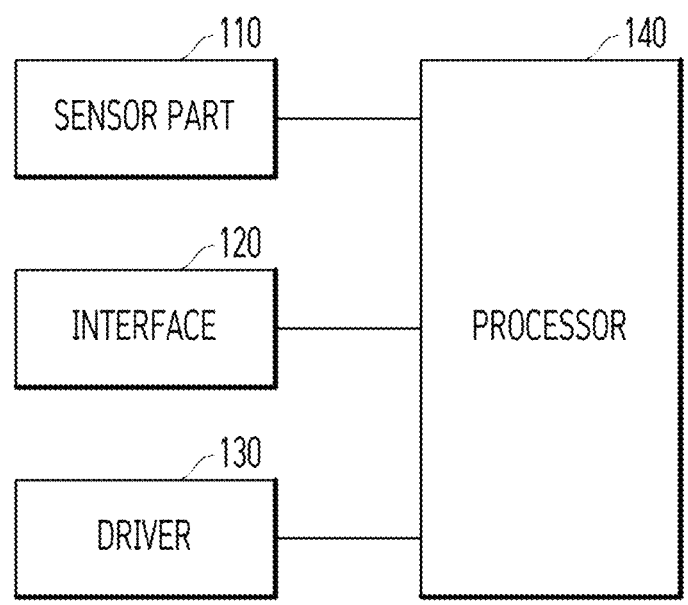
FIG. 1 illustrates a schematic configuration of a driving system of a vehicle according to embodiments of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

Throughout this specification, unless explicitly described to the contrary, the word "comprise" and variations such as "comprises" or "comprising", will be understood to imply the inclusion of stated elements but not the exclusion of any other elements.

In addition, the 'vehicle' used in the following description is assumed to be a vehicle used for transporting passengers, but is not necessarily limited thereto, and may include urban air mobility (UAM), a bus, and the like.

FIG. 1 illustrates a schematic configuration of a driving system of a vehicle according to embodiments of the present disclosure.

According to embodiments of the present disclosure, the vehicle may include a sensor part 110, an interface 120, a driver 130, and a processor 140.

The sensor part 110 may include at least one sensor for recognizing a state inside and/or outside the vehicle. The sensor part 110 may include, for example, a camera sensor, an infrared sensor, a radar sensor, a voice sensor, a temperature sensor, a humidity sensor, and the like.

The interface 120 may include at least one interface that provides a user of the vehicle with various audiovisual data or information related to the vehicle or not, and/or provides a control tool for the vehicle or component(s) thereof. The interface 120 may include, for example, front display(s) provided to passenger(s) and/or sound device(s) provided to the passenger(s). The interface 120 may exchange signals with at least one electronic device in the vehicle in a wired or wireless manner. The interface 120 may convert an input from the user of the vehicle into an electrical signal and provide the converted electrical signal to the processor 140.

The driver 130 may physically drive and/or drive internal or external components of the vehicle based on control of the processor 140. The driver 130 may, for example, change the physical position(s) of wheel(s), steering wheel, seat(s), and front display(s) of the vehicle.

The processor 140 may include at least one processor. The at least one processor in the processor 140 may be electrically connected to components (e.g., sensor part, interface, and communicator (not shown)) of the vehicle to exchange signals and control the components of the vehicle. The processor 140 may further include at least one memory (not shown). The at least one processor may be referred to as a controller, a microcontroller, a microprocessor, or a microcomputer. The at least one processor may be implemented as hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the at least one processor. The functions, procedures, proposals and/or methods disclosed in this specification may be implemented using firmware or software, and firmware or software may be implemented to include a module, a procedure, a function, and the like. Firmware or software configured to perform the function, procedure, proposal and/or method disclosed in this specification may be included in at least one processor or stored in at least one memory and driven by at least one processor. The function, procedure, proposal and/or method disclosed in this specification may be implemented using firmware or software in the form of a code, an instruction and/or a set of instructions.

The processor 140 may generate control signals for the sensor part 110, the interface 120 and/or the driver 130 based on electrical signals received from the sensor part 110 and/or the interface 120.

The at least one memory may be connected to at least one processor and may store various information related to operations of the at least one processor. For example, the at least one memory may perform some or all of the processes controlled by the at least one processor, or may store a software code including instructions for performing procedures and/or methods described/proposed below. The at least one memory may store instructions, indications or programs, which, when executed, may cause at least one processor operably connected to the at least one memory to perform operations according to embodiments of the present disclosure.

The vehicle may further include a communicator. The communicator may include one or more transceivers, and receive user data, control information, a radio signal/channel, and the like referred to in functions, procedures, proposals, methods and/or operational flowcharts disclosed in this specification from one or more other devices through the one or more transceivers. For example, the one or more transceivers may be connected to the processor 140 and transmit and/or receive a radio signal. For example, at least one processor in the processor 140 may control one or more transceivers to transmit user data, control information, or a radio signal to at least one other device. The processor 140 may control one or more transceivers to receive user data, control information, or a radio signal from one or more other devices. In addition, one or more transceivers may be connected to one or more antennas, and one or more transceivers may be configured to transmit and/or receive user data, control information, a radio signal/channel, and the like with other device(s) through one or more antennas.

Figure 2:
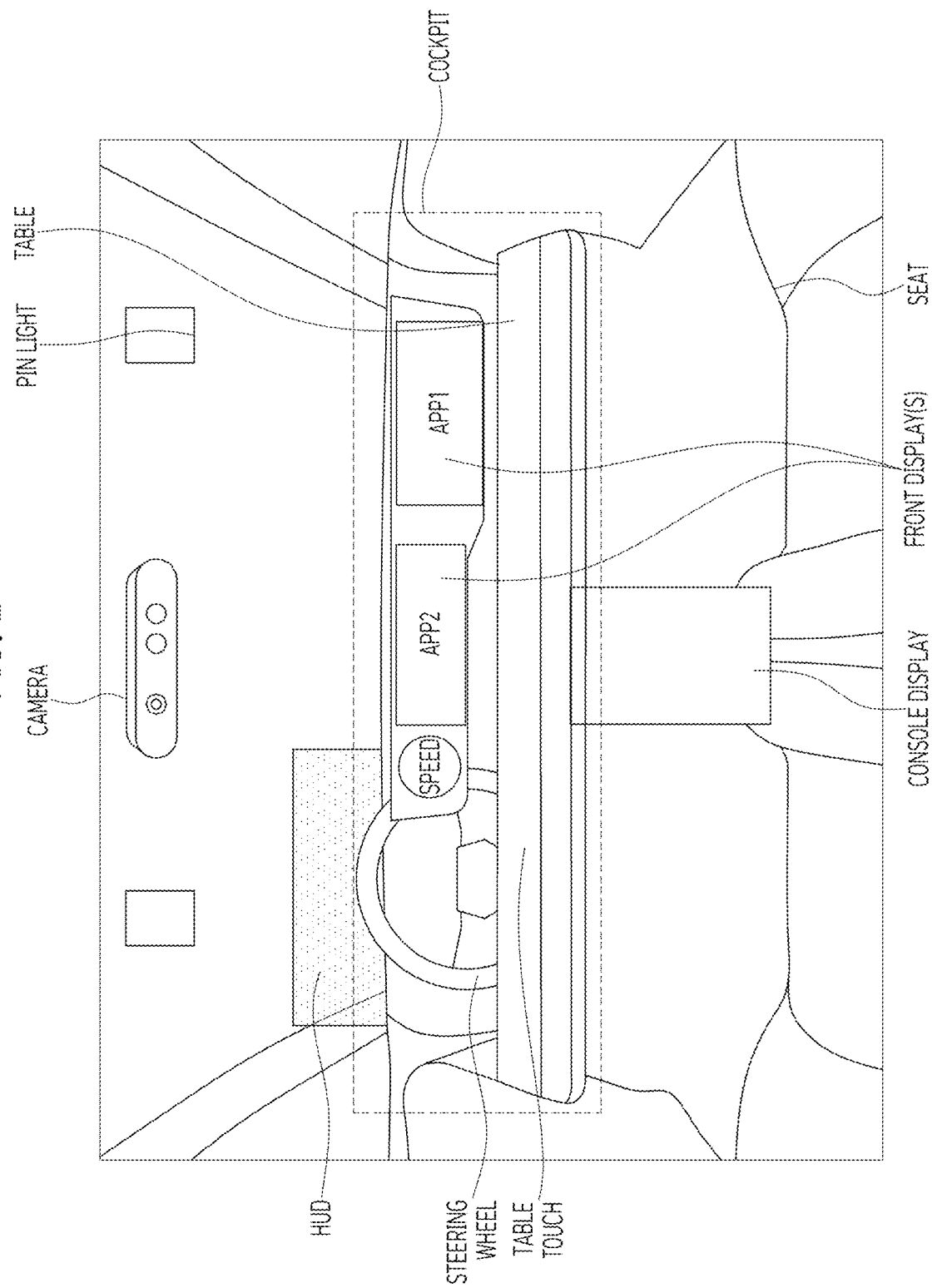
FIG. 2 is a diagram for explaining the internal configuration of a mobile vehicle according to an embodiment of the present disclosure.

FIG. 2 is a diagram for explaining the internal configuration of a mobile vehicle according to an embodiment of the present disclosure.

First, the vehicle according to the embodiment shown in FIG. 2 may include at least one camera for detecting a state of the inside of the vehicle, a head-up front display (HUD), front display(s) providing audio-visual information to passenger(s), and a front display(s) providing state information of the vehicle to a passenger and/or providing control of a gear, air conditioning, and/or seat(s) of the vehicle. The vehicle also includes a steering wheel, seat(s), and light(s).

According to an embodiment of the present disclosure, the front display may be disposed on one side of a driver seat or in a space between the driver seat and a passenger seat when there is the passenger seat. The front display may include a moving display device. The moving display device may be configured such that a moving display performs at least one of forward moving, backward moving, and tilting when a boarding mode of the vehicle is changed.

For example, the driving mode of the vehicle may include an autonomous driving mode and a manual driving mode.

For example, the moving display device may be configured such that the moving display moves forward in a direction of the driver and tilts in a direction of a cockpit when the boarding mode of the vehicle is an autonomous driving mode.

For example, if the boarding mode is a manual driving mode, the moving display may be configured to rotate to restore a state prior to tilting and move the display backward in the direction of the cockpit.

In addition, the front display according to the present embodiment may provide a control system required for vehicle driving, and a display system and an office screen according to a user state.

Figure 3:
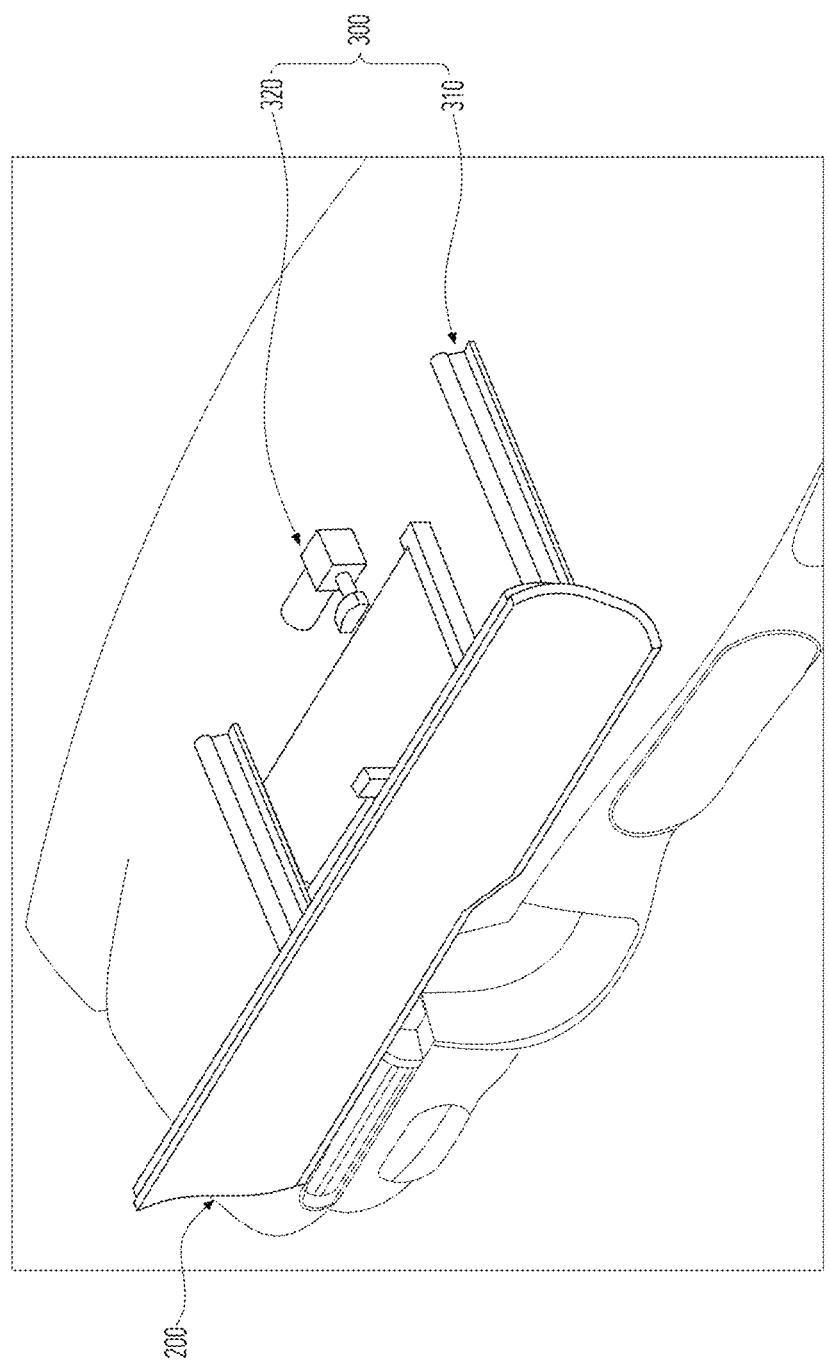
FIG. 3 is a diagram for explaining an operation of a moving display device according to an embodiment of the present disclosure.

FIG. 3 is a diagram for explaining an operation of a moving display device according to an embodiment of the present disclosure.

Referring to FIG. 3, the moving display device may include a display 200 disposed in the cockpit of the vehicle and moveable in a forward or backward direction, and a moving device 300 integrally mounted on the rear of the display 200 to move the position of the display 200 forward and backward.

As described later, the moving device 300 may be implemented by a rail 310 and an actuator 320. An embodiment of the present disclosure proposes that the moving device 300 at a rear end of the display 200 moveable in a forward or backward direction uses two rails, and although the example of FIG. 1 shows two rails, the present embodiment is not necessary to be limited thereto.

In the case of using two rails, it is proposed to place the actuator 320 in the center of the rails to provide a driving force for forward or backward movement of the display 200. That is, the display 200 of the present embodiment may be a large display to be operated not only from a driver seat but also from a front passenger seat. The moving device 300 may have a predetermined thickness or less to ensure a space for disposing other components (e.g., HUD).

Figure 4:
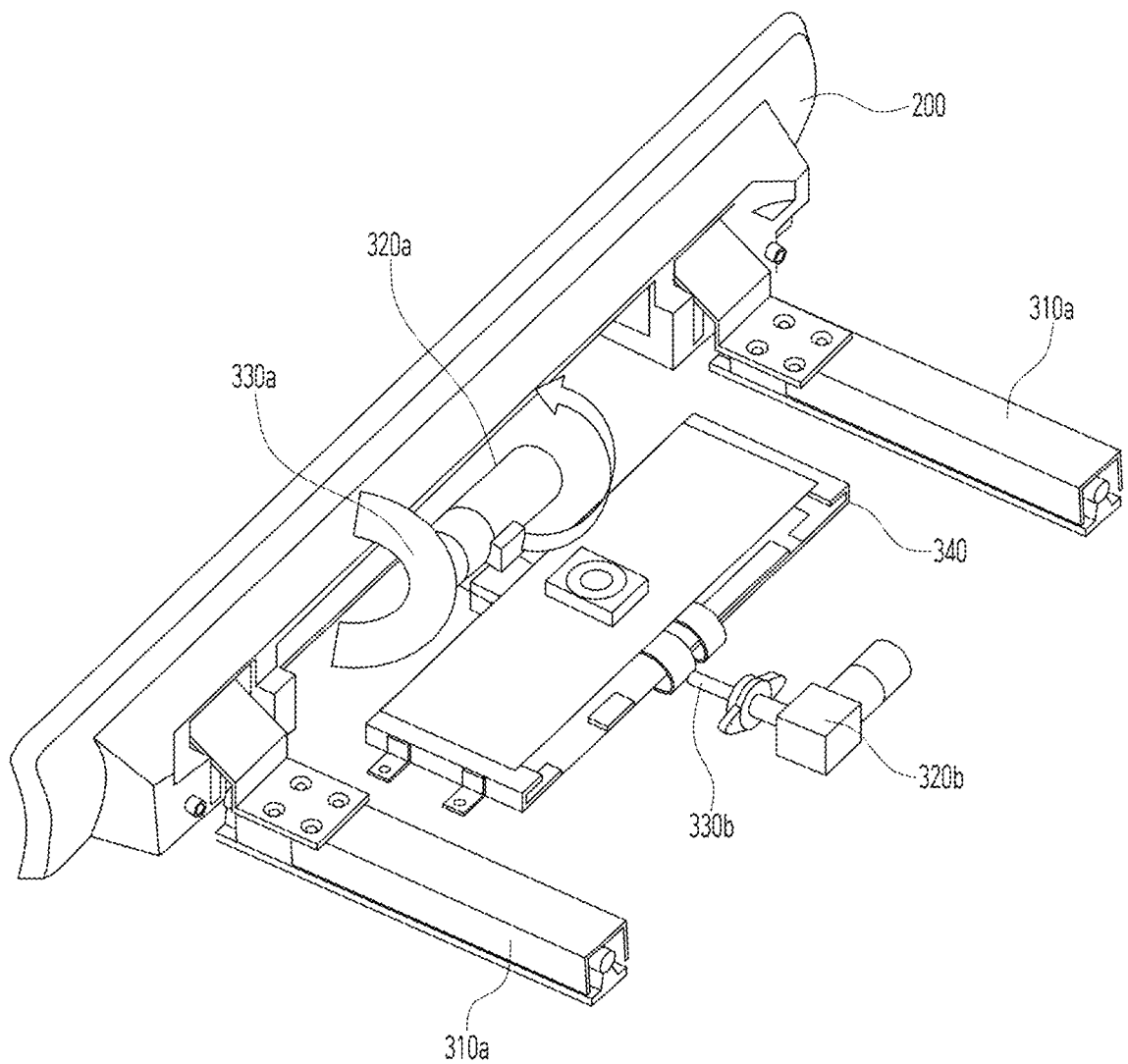
FIG. 4 is a diagram for explaining a detailed configuration of a moving display according to an embodiment of the present disclosure.

FIG. 4 is a diagram for explaining a detailed configuration of a moving display according to an embodiment of the present disclosure.

The moving display according to an embodiment of the present disclosure may be formed such that components for forward or backward movement of the display are disposed through the moving device 300 disposed behind the display.

First, the moving device 300, which is integrally mounted on the rear of the display and a position of which is moved along with movement of the display, may include a predetermined number of rails 310*a* and 310*b* and a predetermined number of actuators 320*a* and 320*b*.

In the example of FIG. 4, the predetermined number of actuators 320*a* and 320*b* and a predetermined number of gear modules 330*a* and 330*b* may be included in the center of the two rails 310*a* and 310*b*. FIG. 4 shows arrangement of the two actuators 320*a* and 320*b* including the actuator for tilting 320*a* providing a driving force for moving a display in a vertical direction and the actuator for forward or backward movement 320*b* providing a driving force for forward or backward movement of the display.

Here, the predetermined number of gear modules 330*a* and 330*b* may include the gear module for tilting 330*a* disposed at one side of the actuator for tilting 320*a* and the gear module for forward or backward movement 330b disposed in front of the actuator for forward or backward movement 320b.

In this case, according to proposal, a printed circuit board (PCB) 340 may be disposed between the predetermined number of gear modules 330a and 330b.

An embodiment of the present disclosure proposes that the moving device 300 has a predetermined thickness or less to ensure a display installation space within a cover section of the rail 310.

FIGS. 5A-5D are diagrams for explaining the principle of forward and backward movement and tilting of a moving display device using one actuator and a spring according to an embodiment of the present disclosure.

Figure 5A:
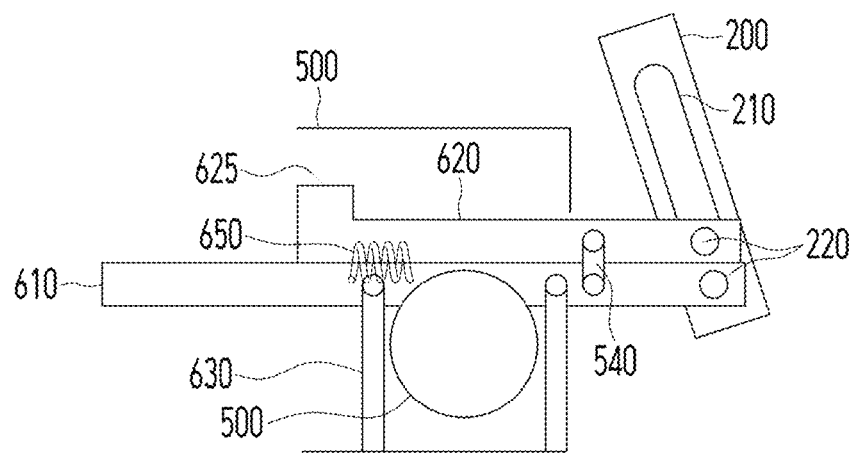
FIGS. 5A-5D are diagrams for explaining the principle of forward and backward movement and tilting of a moving display device using one actuator and a spring according to an embodiment of the present disclosure.
Figure 5B:
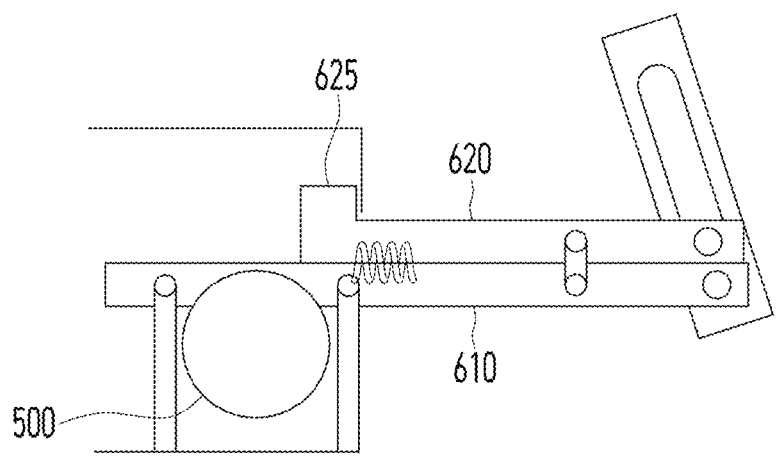
Figure 5C:
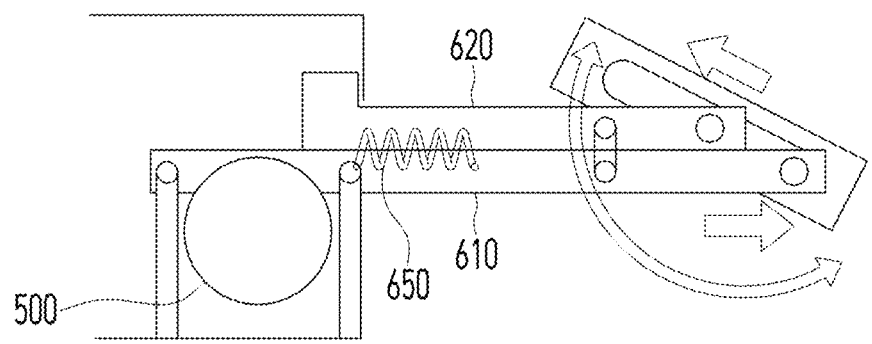
Figure 5D:
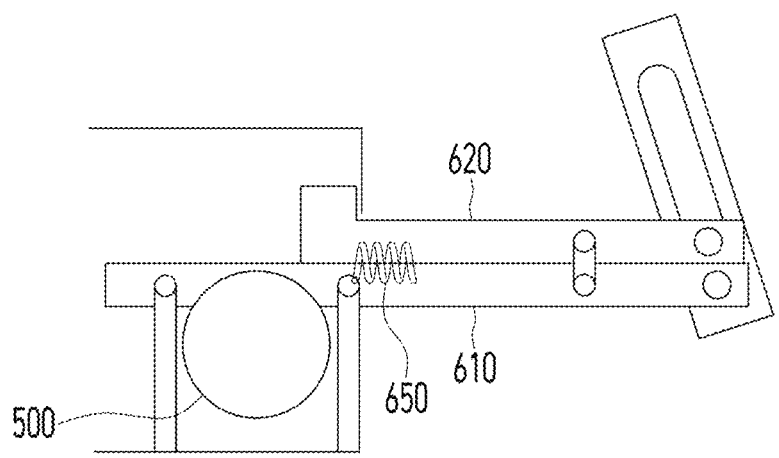

FIG. 5A is a diagram showing a basic state in which a display is disposed in a vehicle, FIG. 5B is a diagram showing a form in which the display protrudes toward a driver and is located in the front, FIG. 5C is a diagram showing a form in which the display tilts in a direction of a cockpit, and FIG. 5D is a diagram showing a form in which the display is restored to a basic state by tilting.

As shown in FIG. 5A, the rail has a form in which moving rails to which a two-stage sliding type is applied are overlapped.

The moving rails 610 and 620 may be overlapped in a vertical direction, and the moving rails 610 and 620 may be coupled to a display hinge 220 disposed on a display rail 210 located on a side surface of the display.

The first moving rail 610 may be coupled to a rail regulation bush 630 disposed within a cockpit 400. One end of the second moving rail 620 may be connected to the display hinge 220, and the other end of the second moving rail 620 may be formed with a flange 625.

The first moving rail 610 and the second moving rail 620 may be coupled at one region by a rail connection bush 640 and at the other end by a tension spring 650.

As shown in FIG. 5B, when the display 200 protrudes forward, the moving rails 610 and 620 are simultaneously moved by an actuator 500 and protrude from the cockpit 400. In this case, the flange 625 of the second moving rail 620 is caught in the cockpit 400, causing the second moving rail 620 to stop.

As shown in FIG. 5C, when the display 200 tilts, only the first moving rail 610 is moved forward by the actuator 500, and the display 200 is tilted backward by the display hinge 220. At this time, the tension spring 650 may be extended as the first moving rail 610 protrudes forward.

As shown in FIG. 5D, when the display 200 is restored by tilting, the tension spring 650 may be restored and the first moving rail 610 may move backward. In addition, the moving rails 610 and 620 may move backward at the same time to restore the display 200 from a tilting state to a basic state.

FIG. 6A-6D are diagrams for explaining the principle of forward or backward movement of a moving device using an actuator and a display gear according to an embodiment of the present disclosure.

Figure 6A:
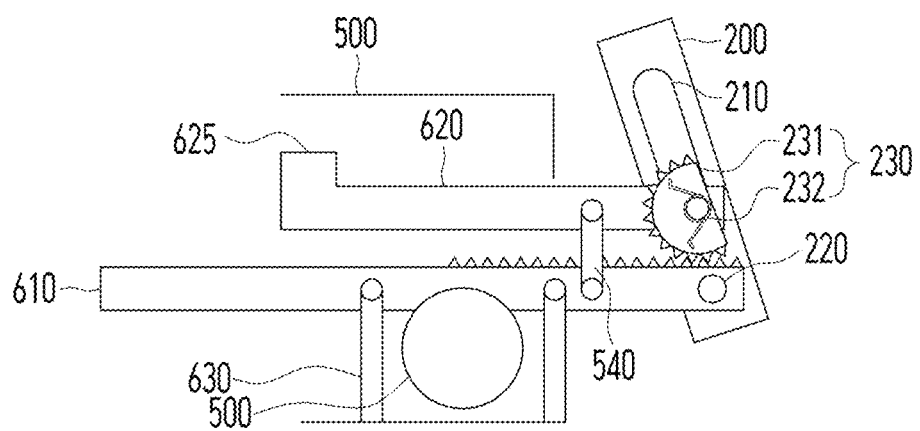
FIGS. 6A-6D are diagrams for explaining the principle of forward or backward movement of a moving device using an actuator and a display gear according to an embodiment of the present disclosure.
Figure 6B:
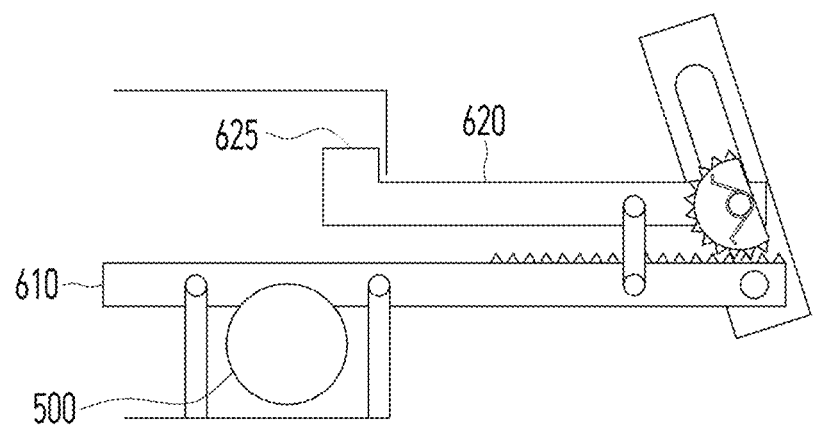
Figure 6C:
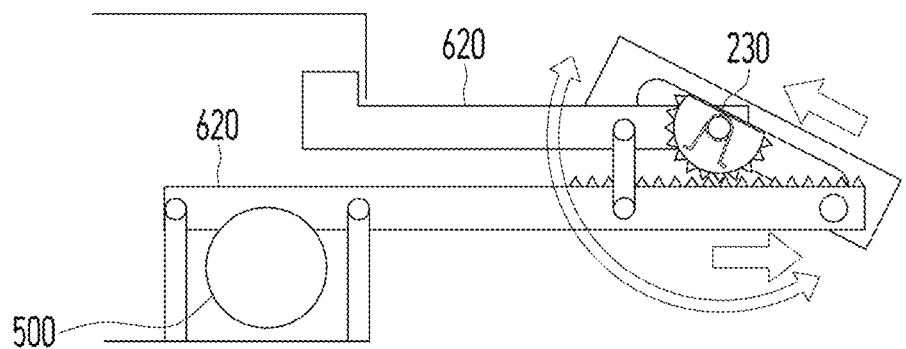
Figure 6D:
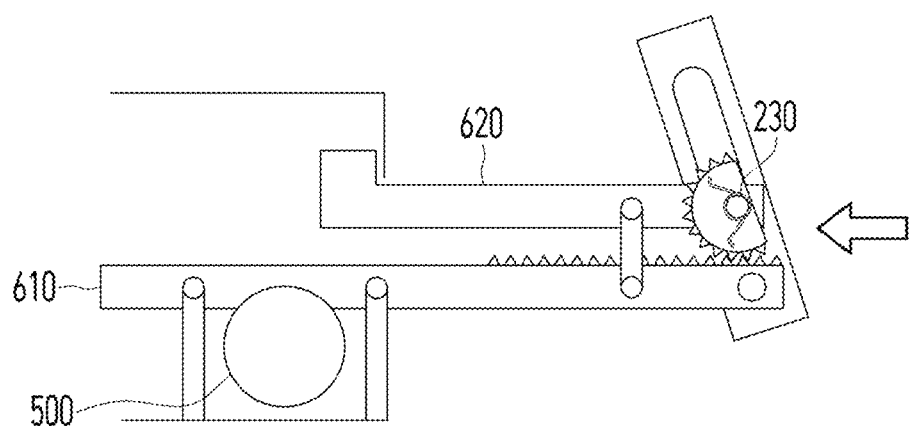

FIG. 6A is a diagram showing a basic state in which a display is disposed in a vehicle, FIG. 6B is a diagram showing a form in which the display protrudes toward a driver and is located in the front, FIG. 6C is a diagram showing a form in which the display tilts in a direction of a cockpit, and FIG. 6D is a diagram showing a form in which the display is restored to a basic state by tilting.

As shown in FIG. 6A, the rail has a form in which moving rails to which a two-stage sliding type is applied are overlapped.

The moving rails 610 and 620 may be overlapped in a vertical direction, and the first moving rail 610 may be coupled to the display hinge 220 disposed on the display rail 210 located on a side surface of the display. The second moving rail 620 may be coupled to a display gear 230 disposed on the display rail 210 positioned on a side surface of the display.

The display gear 230 may include a rotating gear 231 and a torsion spring 232.

The display gear 230 may implement movement of the display by pushing or pulling the display 200 through engagement with a gear part formed at one end of the first moving rail 610 according to driving of the actuator 500.

The first moving rail 610 may be coupled to the rail regulation bush 630 disposed within the cockpit 400. One end of the second moving rail 620 may be connected to the display hinge 220, and the other end of the second moving rail 620 may be formed with a flange 625. The first moving rail 610 and the second moving rail 620 may be coupled at one region by the rail connection bush 640.

As shown in FIG. 6B, when the display 200 protrudes forward, the moving rails 610 and 620 are simultaneously moved by an actuator 500 and protrude from the cockpit 400. In this case, the flange 625 of the second moving rail 620 is caught in the cockpit 400, causing the second moving rail 620 to stop.

As shown in FIG. 6C, when the display 200 tilts, only the first moving rail 610 is moved forward by the actuator 500, and the display 200 is tilted backward by the display hinge 220. In addition, the torsion spring 232 located within the display gear 230 may be compressed and the rotating gear 231 may be rotated counterclockwise.

As shown in FIG. 6D, when the display 200 is restored by tilting, the torsion spring 232 may be restored and the rotating gear 231 may be rotated clockwise. In addition, the moving rails 610 and 620 may move backward at the same time to restore the display 200 from a tilting state to a basic state.

Figure 7A:
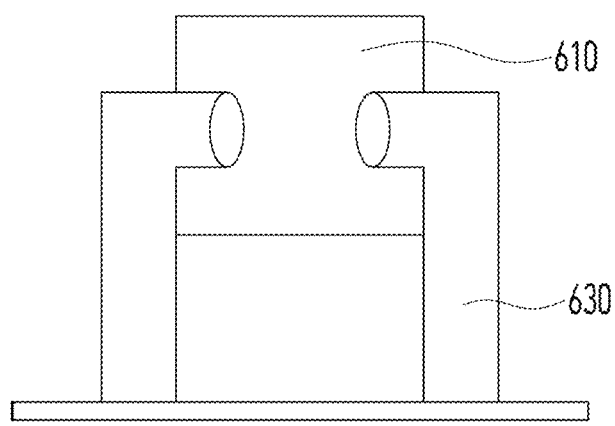
FIGS. 7A-7B are diagrams for explaining a rail regulation bush according to an embodiment of the present disclosure.
Figure 7B:
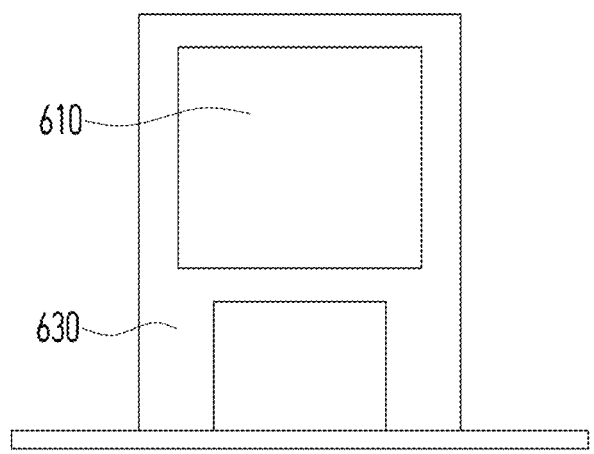

FIGS. 7A-7B are diagrams for explaining a rail regulation bush according to an embodiment of the present disclosure.

Referring to FIGS. 7A-7B, the rail regulation bush 630 may be configured in a form to maintain flow, deflection, bending stiffness and protruding stiffness during rail moving.

As shown in FIG. 7A, the rail regulation bush 630 may be disposed on a side surface or upper and lower ends of the first moving rail 610 in a bush shape in a form aligned with grooves.

As shown in FIG. 7B, the rail regulation bush 630 may be applied in a form surrounding an entire rim of the first moving rail 610. A cross-sectional shape of the first moving rail 610 may be applied in various shapes such as a square and circle.

As disclosed above, an embodiment provides a technology for ensuring the convenience of a passenger by allowing a display to be moved forward or rearward according to a driving mode of a vehicle and tiltable through rotation of the display.

As disclosed above, an embodiment provides a technology for ensuring movement of various displays according to the driving type of the vehicle.

As disclosed above, an embodiment provides technology for ensuring space efficiency and safety with other elements disposed at a front side of a vehicle when implementing a moving display.

As disclosed above, depending on the driving mode of the vehicle, the display may be moved forward or backward, and thus the vehicle may be moved to a position at which full-screen touch manipulation is possible beyond the usability of a vehicle display for used in a general driving situation, thereby improving convenience by maximizing the usability of a large-screen display.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A moving display device comprising:
a display configured to be moveable in a forward or backward direction, relative to a vehicle, according to a driving mode of the vehicle; and
a moving device mounted on a rear of the display and being configured to move a position of the display and to tilt the display,
wherein the moving device comprises rails, actuators, and gear modules for forward or backward movement of the display relative to the vehicle, and
wherein the driving mode of the vehicle comprises an autonomous driving mode and a manual driving mode, wherein the moving display moves forward in a direction of a driver and tilts in a direction of the cockpit, in response to the boarding mode of the vehicle being the autonomous driving mode, wherein the moving display rotates to a state prior to tilting and the moving display moves backward in a direction of the cockpit, in response to the boarding mode being the manual driving mode.

2. The moving display device of claim 1, wherein the moving device comprises an actuator of the actuators configured to provide a driving force for forward or backward movement of the display.

3. The moving display device of claim 2, wherein the rails comprise:
a first moving rail configured to be moved forward and backward by the actuator;
a second moving rail disposed above the first moving rail; and
a rail connection bush connecting the first moving rail and the second moving rail;
wherein a first end of the first moving rail and a first end of the second moving rail are each coupled to the display.

4. The moving display device of claim 3, wherein the first end of the first moving rail and the first end of the second moving rail are each coupled to a display hinge, and a second end of the first moving rail and a second end of the second moving rail are coupled by a tension spring.

5. The moving display device of claim 4, wherein the actuator is configured to move the first and second moving rails forward simultaneously, in response to the display protruding forward; and
a flange located at the second end of the second moving rail is configured to move the second moving rail by a distance and to stop the second moving rail.

6. The moving display device of claim 5, wherein in response to the display tilting, a displacement of the first moving rail is larger than a displacement of the second moving rail, the tension spring is extended, and the display is tilted backward by the display hinge.

7. The moving display device of claim 6, wherein, when in response to the display being restored from tilting, the tension spring is decompressed to move the first moving rail backward, and the first and second moving rails move backward simultaneously with the display being restored from tilting.

8. The moving display device of claim 3, wherein the first end of the first moving rail is coupled to a display hinge and the first end of the second moving rail is coupled to a display gear, and
the display gear comprises a rotating gear and a torsion spring, and is configured to move the display forward and backward through engagement between a gear part formed on the first moving rail and the rotation gear.

9. The moving display device of claim 8, wherein the actuator is configured to move the first and second moving rails forward simultaneously in response to the display protruding forward; and
a flange located at the second end of the second moving rail is configured to move the second moving rail by a distance and to stop the second moving rail.

10. The moving display device of claim 9, wherein in response to the display tilting, a displacement of the first moving rail is larger than a displacement of the second moving rail, the torsion spring is compressed, and the rotating gear rotates counterclockwise to tilt the display backward.

11. The moving display device of claim 10, wherein, in response to the display being restored from tilting, the torsion spring is decompressed, the rotating gear rotates clockwise to move the first moving rail backward, and the first and second moving rails move backward simultaneously with the display being restored from tilting.

12. A vehicle, comprising:
a cockpit; and
a moving display device mounted in the cockpit of the vehicle,
wherein the moving display device comprises
a display configured to be moveable in a forward or backward direction according to a driving mode of a vehicle, and
a moving device mounted on a rear of the display and being configured to move a position of the display and to tilt the display,
wherein the moving device comprising rails, actuators, and gear modules for forward or backward movement of the display, and
wherein the moving display is configured to perform at least one of forward movement, backward movement, or tilting, in response to a boarding mode of the vehicle being changed,
wherein the driving mode of the vehicle comprises an autonomous driving mode and a manual driving mode, wherein the moving display moves forward in a direction of a driver and tilts in a direction of the cockpit, in response to the boarding mode of the vehicle being the autonomous driving mode, wherein the moving display rotates to a state prior to tilting and the moving display moves backward in a direction of the cockpit, in response to the boarding mode being the manual driving mode.

13. A vehicle comprising:

a display mounted on an assembly that is in cockpit of the vehicle;

the assembly comprising:
- a first servo configured to slide the display frontward and rearward relative to a front and a rear of the vehicle;
- a second servo configured to tilt the display on an axis perpendicular to the length of the vehicle; and
- a computing apparatus configured to provide a signal to be displayed by the display and configured to control the first and second servos according to a driving mode of the vehicle, wherein the driving mode of the vehicle comprises an autonomous driving mode and a manual driving mode, wherein the moving display moves forward in a direction of a driver and tilts in a direction of the cockpit, in response to the boarding mode of the vehicle being the autonomous driving mode, wherein the moving display rotates to a state prior to tilting and the moving display moves backward in a direction of the cockpit, in response to the boarding mode being the manual driving mode.

14. The vehicle of claim 13, wherein the assembly further comprises:
- a first moving rail configured to be moved frontward and rearward by the first servo;
- a second moving rail disposed above the first moving rail; and
- a rail connection bush connecting the first moving rail and the second moving rail;
- wherein a first end of the first moving rail and a first end of the second moving rail are each coupled to the display.

15. The moving display device of claim 14, wherein the first end of the first moving rail is coupled to a display hinge and the first end of the second moving rail is coupled to a display gear, and the display gear comprises a rotating gear and a torsion spring, and is configured to move the display frontward and rearward through engagement between a gear part formed on the first moving rail and the rotation gear.

* * * * *